Sept. 22, 1953    A. J. RICHARDS    2,652,886
ATTACHING FRAME FOR SEAT COVERS
Filed April 3, 1950    2 Sheets-Sheet 1
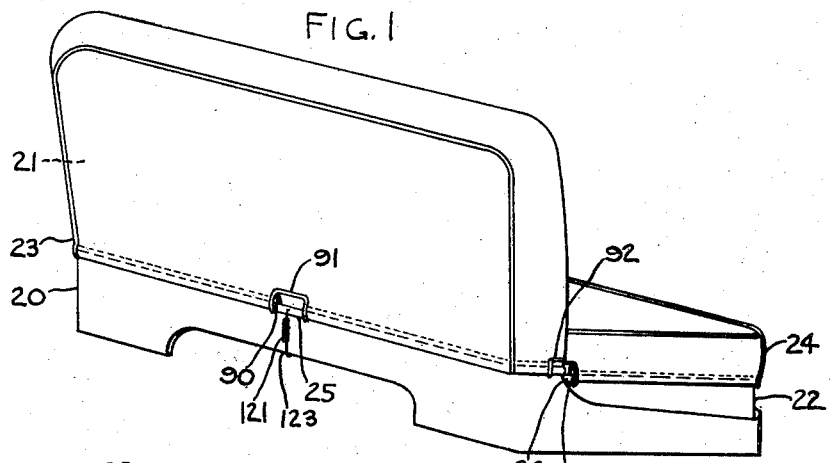
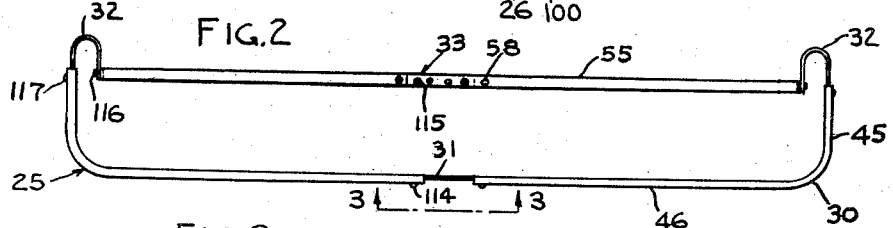
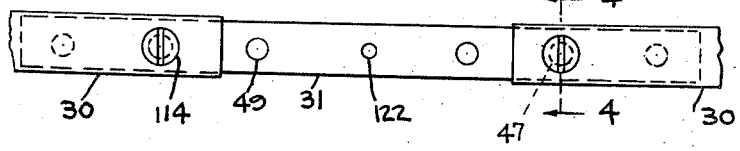
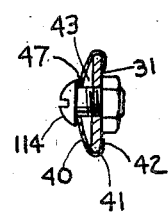
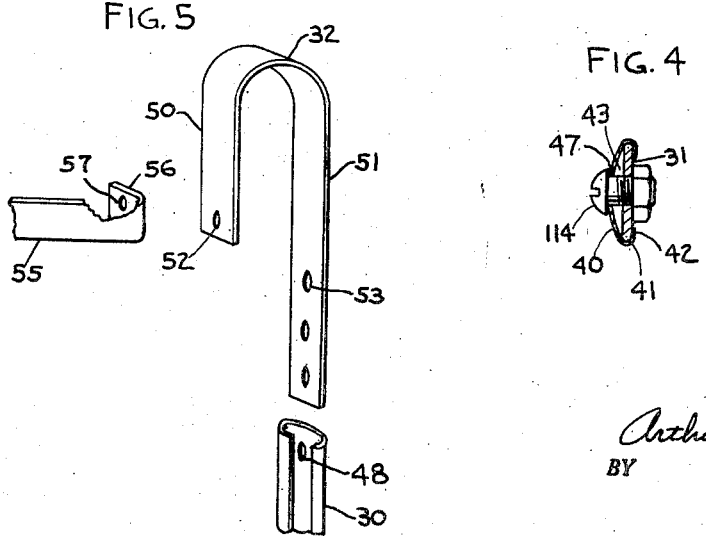
INVENTOR.
Arthur J. Richards
BY Sept. 22, 1953  A. J. RICHARDS  2,652,886
ATTACHING FRAME FOR SEAT COVERS
Filed April 3, 1950  2 Sheets-Sheet 2
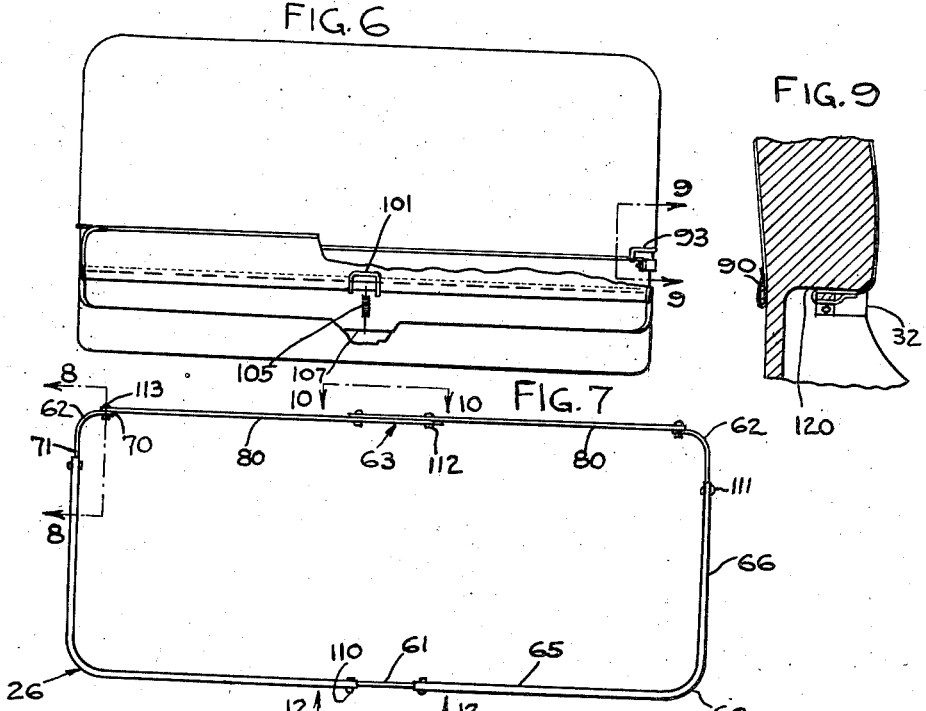
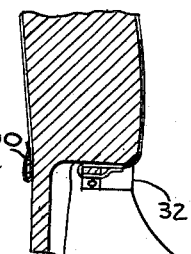
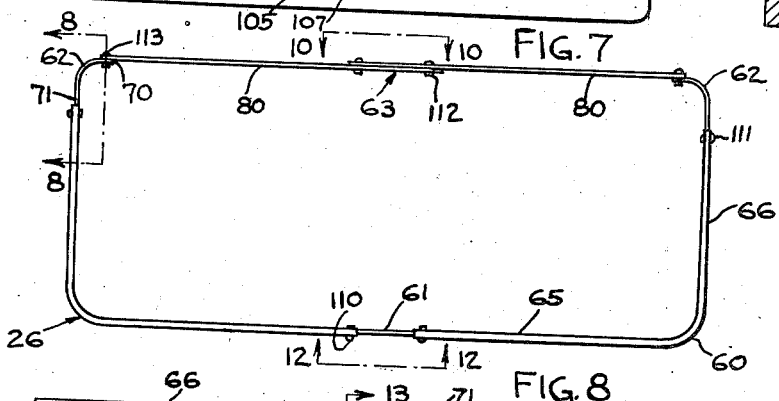
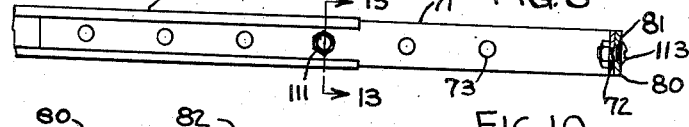
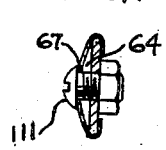
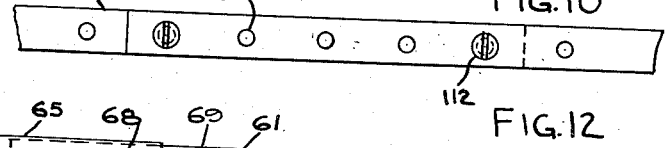
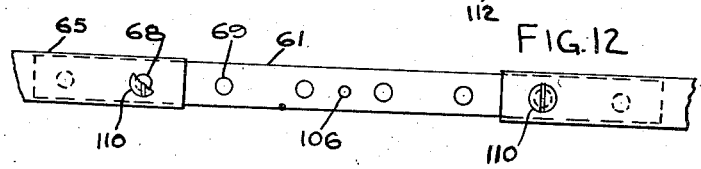
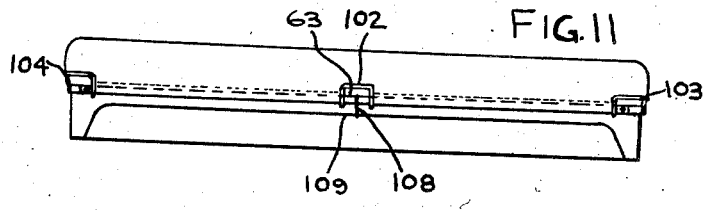
INVENTOR.
Arthur J. Richards
BY Patented Sept. 22, 1953

2,652,886

UNITED STATES PATENT OFFICE 2,652,886

ATTACHING FRAME FOR SEAT COVERS

Arthur J. Richards, Detroit, Mich.

Application April 3, 1950, Serial No. 153,643

2 Claims. (Cl. 155—182)

This invention relates to seat covers and particularly to frames for attaching covers to the cushions and back rests of automobiles.

The main objects of this invention are to provide attaching frames for seat covers so that the covers can be easily and quickly attached to the seat cushions and back rests of automobiles without the use of tacks and hooks; to provide attaching frames for seat covers that are adjustable to fit the different size seats found in various types and makes of automobiles; and to provide attaching frames for seat covers that will allow materials such as transparent plastic to be used to cover the upholstering without damaging the material with tacks and hooks.

Other objects and features of the invention will become apparent as the description proceeds especially when taken in conjunction with the accompanying drawing.

Figure 1 is a perspective view, looking from the back, showing the seat covers attached to the cushion and back rest of the front seat assembly of an automobile with the attaching frames holding covers in place.

Figure 2 is a plan view of the attaching frame used to hold the cover on the back rest.

Figure 3 is an enlarged view looking in the direction of the arrows 3—3, Fig. 2.

Figure 4 is an enlarged sectional view taken through the line 4—4, Fig. 3.

Figure 5 is an enlarged perspective view of parts shown in Fig. 2 and before assembling.

Figure 6 is a front view partly broken away of the seat assembly shown in Fig. 1.

Figure 7 is a plan view of the frame used to hold the cover on the cushion.

Figure 8 is an enlarged sectional view taken through the line 8—8, Fig. 7.

Figure 9 is an enlarged sectional view taken through the line 9—9, Fig. 6.

Figure 10 is an enlarged view looking in the direction of the arrows 10—10, Fig. 7.

Figure 11 is a view looking at the back of the cushion with the cushion removed from the seat assembly and the cover in place.

Figure 12 is a view looking in the direction of the arrows 12—12, Fig. 7.

Figure 13 is an enlarged sectional view taken through the line 13—13, Fig. 8.

Referring in detail to the drawings, 20 represents the front seat assembly of an automotive vehicle, 21 the back rest portion that is integral with the frame, 22 the cushion that is removable from the frame, 23 the cover over the back rest, 24 the cover over the cushion, 25 the frame holding the cover on the back rest and 26 the frame holding the cover on the cushion.

The attaching frame 25 comprises two like corner members 30, a connecting member 31, two like end pieces 32 and a tie rod 33.

The corner members 30 are formed from a flat strip of metal with a curved face 40 return bent at both edges to form rounded surfaces 41 with flanges 42 substantially parallel to the surface 40 and terminating to allow an opening into a hollow or recess 43 that extends the full length of the member. A right angle bend forms a short leg 45 and a long leg 46 with a hole 47 adjacent the end of the long leg and a hole 48 adjacent the end of the short leg.

The connecting member 31 is made of metal of a width and thickness to have a sliding fit in the recess 43 of the corner members. A plurality of holes 49 are spaced along its length. The end pieces 32 are formed in a U shape of metal of the same width and thickness as the connecting member 31 and have a short leg 50 and a long leg 51. The long leg has a sliding fit in the recess 43 of the corner member. A hole 52 is adjacent the end of the short leg and a plurality of holes 53 are spaced along the long leg.

The tie rod 33 is comprised of two like members 55, one end having a right angle bend forming a leg 56. A hole 57 is in the leg. A plurality of holes 58 are spaced along the end opposite the short leg. The members 55 are preferably made of metal the same size in cross section as the end pieces and connecting member.

The attaching frame 26 comprises two like corner members 60, a connecting member 61, two like end pieces 62 and a tie rod 63. The corner members 60 are of metal of the same cross section as member 30 previously described having a recess 64 and with a right angle bend forming a long leg 65 and a shorter leg 66. A hole 67 is located adjacent the end of the shorter leg 66 and a hole 68 adjacent the end of the long leg 65. The connecting member 61 is metal of a width and thickness to have a sliding fit in the recess 64 of the corner members and has a plurality of holes 69 spaced along its length.

The end pieces 62 are metal of the same width and thickness as member 61 with a sliding fit in the recess 64 of the corner members. A right angle bend forms a short leg 70 and a long leg 71. A hole 72 is adjacent the end of the short leg and a plurality of holes 73 spaced along the long leg. The tie rod 63 comprises two like members 80 preferably of metal of the same width and thicknesss as the end pieces. A hole 81 is located adjacent one end and a plurality of holes 82 are spaced along the other end.

The cover 23 can be made of any suitable material and fits snugly over the back rest 21 with the open end of the material terminating in a loop 90 that extends substantially around the periphery of the cover. A gap 91 is at the rear central portion of the loop and gaps 92 and 93 at the side portions of the loop.

The cover 24 is preferably made of the same kind of material as the cover 23 and fits snugly over the cushion 22 with the open end of the material terminating in a loop 100 that extends substantially around the periphery of the cover. A gap 101 is at the front center portion of the loop, a gap 102 at the rear center portion and gaps 103 and 104 at the rear side portions.

To assemble the frame 26 to the cover 24, the corner member 60 is threaded through the loop 100, starting the end of the long leg 65 at the gap 103 and continuing until gap 101 is reached. The other like member 60 is threaded through the loop 100 starting at the gap 104 and continuing until the gap 101 is reached. The connecting member 61 is slid into the recess 64 of the corner members holding them temporarily together. The cushion 22 is removed from the seat assembly and the cover placed over it. The corner members 60 are then permanently fastened together with bolts and nuts 110 with the opening formed by the gap 101 allowing the bolts to pass through holes 68 and the appropriate holes 69 in the member 61 so that the assembly fits snugly around the front and sides of the cushion. The end pieces 62 are then slid into the recess 64 at the end of the short leg 66 of the corner members 60 and fastened by bolts and nuts 111, with the openings formed by the gaps 103 and 104 allowing the bolts to pass through holes 67 and appropriate holes 73 so that the end pieces fit snugly around the rear corner portions of the cushion.

The two like members 80 of the tie rod 63 are fastened together by bolts and nuts 112 with the bolts passing through the appropriate holes 82 so that the tie rod will be of the desired length to join the end pieces. The assembled tie rod is threaded through the loop 100 from the gap 103 to the gap 104 and fastened to the end pieces by bolts and nuts 113 with the bolts passing through holes 81 and 72 at the openings formed by the gaps 103 and 104. It will be understood that the cover is made so that the loop comes in a position on the cushion so that when the frame is adjusted to fit snugly around the cushion the cover will be kept from coming off by the abutment formed at the corners of the cushion by the padding on the top. To assist in holding the cover in place tension spring 105 has one end hooked into the hole 106 located in the member 61 and the other end secured to the bottom portion 107 of the cushion. Wire 108, Fig. 11, has one end secured around the tie rod 63 at the gap 102 and the other end secured to the bottom portion 109 of the cushion.

To assemble the frame 25 to the cover 23 the corner member 30 is threaded through the loop 90 starting the end of the long leg 46 at the gap 92 and continuing until gap 91 is reached. The other like member 30 is started at the gap 93 of the loop 90 and continuing until gap 91 is reached. The connecting member 31 is slid into the recess 43 of the members 30 holding them temporarily in place. With the cushion still removed from the seat assembly the cover is slipped over the back rest. The corner members 30 are then fastened together with bolts and nuts 114, with the opening formed by the gap 91 allowing the bolts to pass through holes 47 and appropriate holes 49 in the member 31 so that the assembly fits snugly around the back rest.

The long legs 51 of the end pieces 32 are then slid into the recess 43 of the members 30. The members 55 of the tie rod 33 are joined together by bolts and nuts 115 using the appropriate holes 58 so that the assembly is of the desired length to join the end pieces. The tie rod 33 is threaded through the loop 90 from gap 92 to gap 93. The tie rod is then fastened to the end pieces 32 by nuts and bolts 116 using holes 52 and 57. The end pieces are fastened to the corner members with bolts and nuts 117 with the bolts passing through the holes 48 and the appropriate holes 53 so that the cover fits snugly over the back rest. The under portion 120 of the back rest serves as an abutment to hold the frame in position. To assist in holding the frame in position along the rear part of the back rest tension spring 121 has one end fastened in hole 122 of the connecting member 31 and the other end hooked under portion 123 of the seat. The cushion can then be placed back in position on the seat assembly.

The construction of the attaching frames are such that they will fit the different size cushions and back rests of similar construction found in the different models and makes of automobiles. All that is necessary is to use the appropriate holes in joining the members of the frame together when assembling them with the covers to the cushion and back rest. It will be understood that the covers are fabricated from patterns to fit each of the individual sizes of cushions and back rests while the connecting member, end pieces and tie rod are of a desired length and have their holes spaced to obtain the desired adjustability. The adjustable feature of the attaching frame makes for economy of manufacture as the necessity for different sizes are eliminated.

With my attaching frames the covers can be made to fit over only the portions of the cushions and back rests that receive the most wear. The portions of the covers that are usually necessary for nailing to tacking strips and attaching to the underside of the seat assemblies by hooks and wires are eliminated. The covers are inexpensive to manufacture and can be put on the seats quickly with the use of ordinary tools.

Such modifications of my inventions may be employed as lie within the scope of the appended claims without departing from the spirit and intention of the invention.

What I claim as my invention is:

1. In a cover formed of pliable material and shaped to surround and be slipped downward over the top of a seat and having an open hem around the periphery of its lower edge, a frame comprising a plurality of elongated rigid separable members insertable into the hem through an opening therein and connected together in an end to end relationship encircling the seat.

2. In a cover formed of pliable material and shaped to surround and be slipped downward over the top of a seat and having an open hem around the periphery of its lower edge, a frame comprising a plurality of elongated rigid separable members insertable into the hem through an opening therein, means connecting said members together in an end to end relationship encircling the seat, said connecting means being adjustable as to the peripheral length of said frame.

ARTHUR J. RICHARDS.

References Cited in the file of this patent

UNITED STATES PATENTS

| Number | Name | Date |
|---|---|---|
| 1,782,815 | Fry | Nov. 25, 1930 |
| 1,951,631 | Sallop | Mar. 20, 1934 |
| 2,191,848 | Cramer et al. | Feb. 27, 1940 |